Oct. 15, 1968

N. FELES ETAL 3,405,968

AUTOMOBILE CONCEALED VENT ARRANGEMENT

Filed Aug. 30, 1966

INVENTORS
Nick Feles &
BY Wilson Harvey West

George E. Johnson
ATTORNEY

Oct. 15, 1968  N. FELES ETAL  3,405,968
AUTOMOBILE CONCEALED VENT ARRANGEMENT
Filed Aug. 30, 1966  2 Sheets-Sheet 2
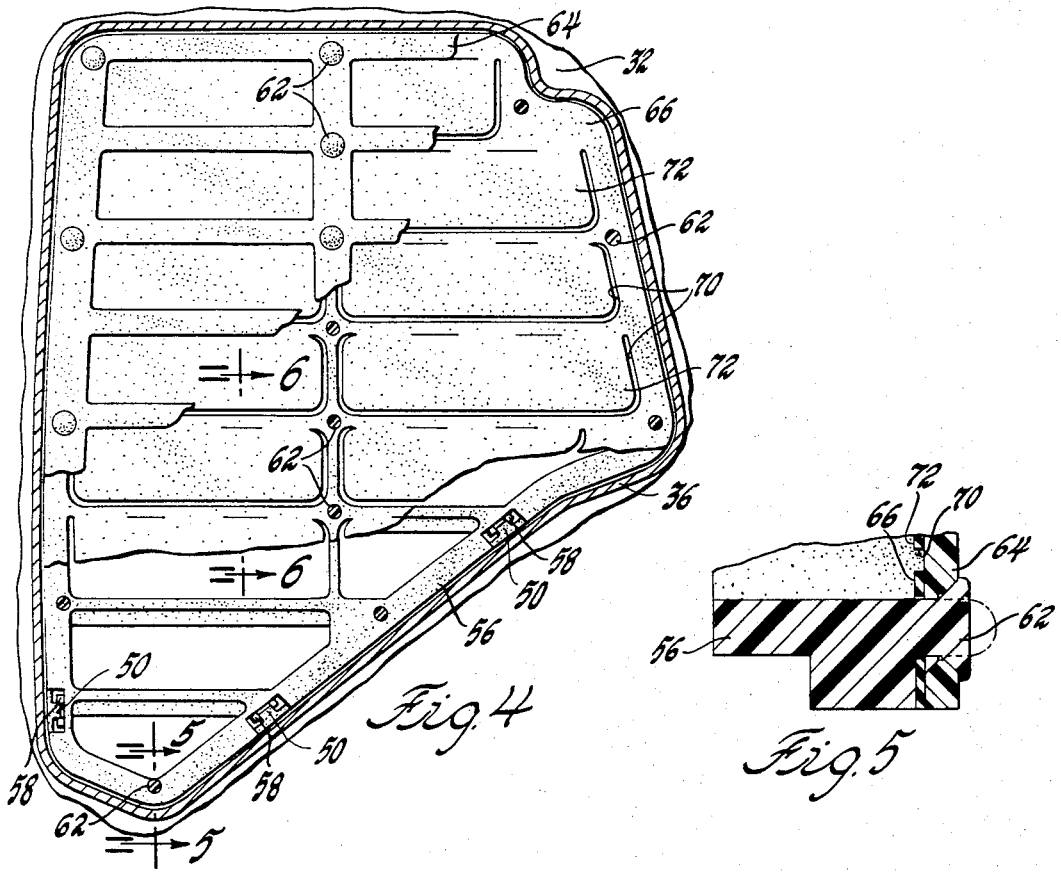
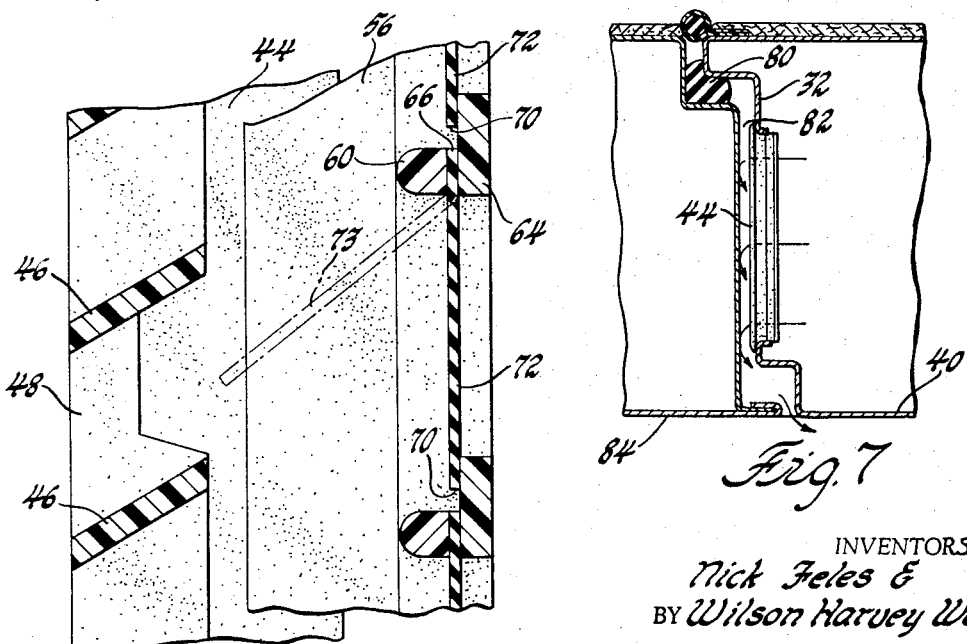
INVENTORS
Nick Feles &
BY Wilson Harvey West
George E. Johnson
ATTORNEY

United States Patent Office 3,405,968
Patented Oct. 15, 1968

3,405,968
AUTOMOBILE CONCEALED VENT ARRANGEMENT
Nick Feles and Wilson Harvey West, Royal Oak, Mich., assignors to General Motors Corporation, Detroit, Mich., a corporation of Delaware
Filed Aug. 30, 1966, Ser. No. 576,085
1 Claim. (Cl. 296—28)

ABSTRACT OF THE DISCLOSURE

An arrangement in an automobile body comprising a duct extending from a rear zone of a passenger compartment to at least one door lock pillar of the body from which air may be exhausted to the atmosphere from between the door and the pillar.

---

This invention relates to a vent arrangement and more particularly to a vent arrangement for discharging stale air from an automobile passenger compartment.

Air discharged from the passenger compartment may be used ventilation air, heated air or cooled air but, in any event, that air should be vented as effectively as possible and consistent with retention of strength in the body structure. The vent arrangement shoulde be low in cost, not of undue size, and be concealed from view in the interest of car appearance. In these respects the present invention is deemed a decided improvement over prior concepts.

An object of the present invention is to provide an improved vent arrangement for an automobile passenger compartment which arrangement is concealed from view although highly effective.

A feature of the present invention is a duct connecting a rear zone of an automobile passenger compartment to a discharge opening facing forwardly with respect to the car and located in a body door pillar-outboard of a body seal.

This and other important features of the application will now be described in detail in the specification and then pointed out more particularly in the appended claim.

In the drawings:

FIGURE 4 is a view looking in the direction of the arrows 4—4 in FIGURE 3 with a rigid back plate and a flexible flat sheet each partially cut away;

FIGURE 5 is a greatly enlarged section view taken along the line 5—5 in FIGURE 4;

FIGURE 6 is a greatly enlarged sectional view looking in the direction of the arrows 6—6 in FIGURE 4 and showing the open and closed positions of a flap; and FIGURE 7 is a sectional view looking downwardly at a left door lock pillar and a door portion and showing a modification.

Figure 1:
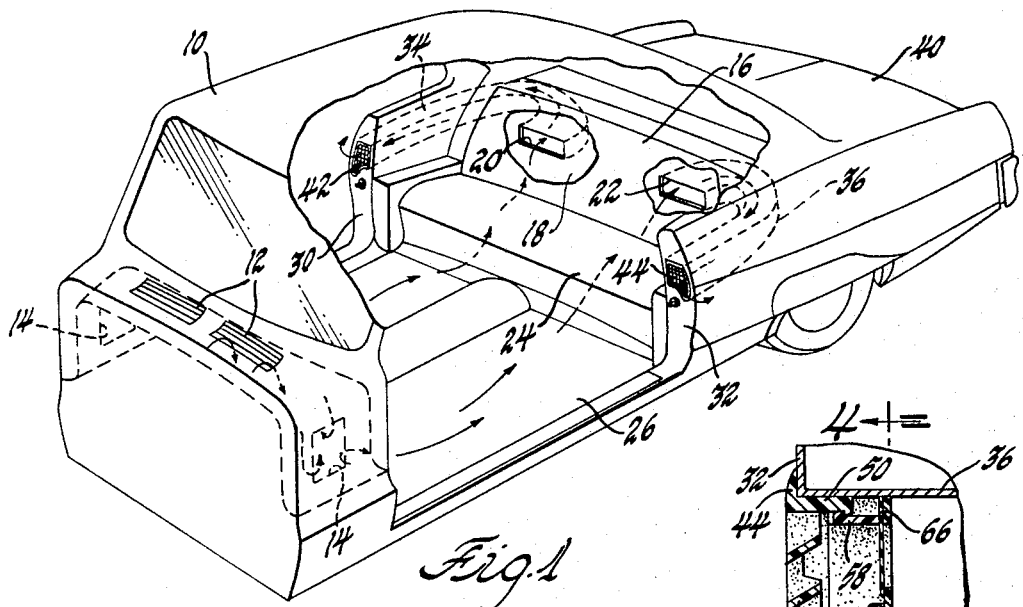
FIGURE 1 is a perspective view with parts broken away of an automobile body in each side of which one embodiment of the present invention is installed.
Figure 2:
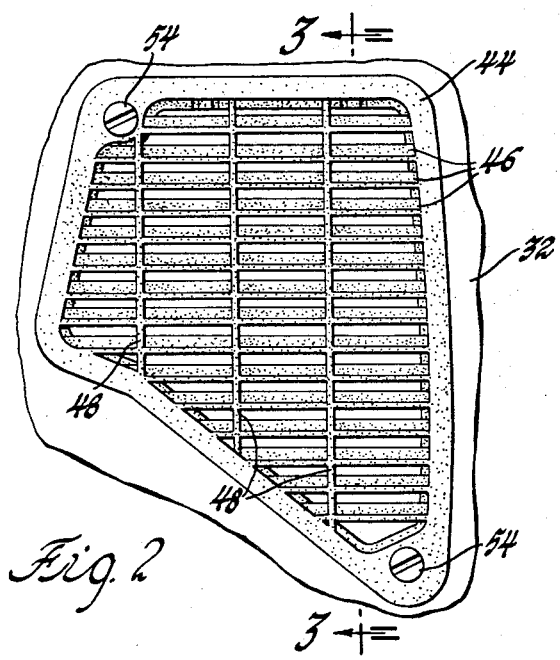
FIGURE 2 is an enlarged elevation view of a grilled one-way left-hand side vent or outlet as shown in FIGURE 1.

In utilizing the present invention in a car, the mode of admitting air to the passenger compartment, whether that air be forced by blower or ram effect, whether it be heated or cooled by a heat exchanger, or whether the air be mere ventilation air are immaterial factors. In FIGURE 1, a mode of admitting ventilation air to a body 10 through the cowl by way of exterior grilles 12 and interior side cowl openings 14 is shown merely as a suitable example. This is similar to the shroud chambers air admission system disclosed in the United States Patent 2,852,997, granted Sept. 23, 1958, in the names of J. D. Leslie, R. M. Fox and E. J. Premo. Any of several well known expedients could be employed for admitting air in practicing the present invention.

A rear seat back cushion is shown at 16 and the cushion supporting structure 18 of the body is made open or with sufficient openings 20 and 22 to permit stale air to exhaust therethrough. Preferably, passages are formed beneath the horizontal cushion 24 for the air to flow along the floor 26, under the cushion 24 and up to and rearwardly through the openings 20 and 22. This stale air then passes into the body structure and to one or both sides of the car. The fender wells and fenders may cooperate with the body structure to constitute adequate duct work for guiding the air rearwardly from the openings 20 and 22 and then forwardly to each door lock pillar 30 or 32. FIGURE 1 depicts special and more confined duct work in the form of two curved ducts 34 and 36 but these are not necessary as other trunk or usual rear body sheet metal structure 40 is ordinarily sufficiently closed to retain a suction effect discussed hereafter and which aids in the venting. The ducts 34 and 36 could be deemed parts of the body structure.

Each door lock pillar 30 or 32 is provided with a grille 42 or 44 at which the duct work 34 or 36 terminates or which is directly receptive to air from the trunk or structure 40. These grilles are to the opposite hand but are otherwise similar so only the left side grille 44 is described herein in detail.

The grille 44 bears louvers or vanes 46 traversed by vertical ribs 48 and is flanged as at 50 to fit within a recess 52 in the lock pillar 32. Screws 54 hold the grille in place. Telescopically fitted within the flange 50 is a perimetral flange 56 of a one-way valve arrangement held to the flange 50 by detent or stepped tongues 58 integral with the flange 56 and an intermediate grille 60. Also, integral with the intermediate grille 60 are cylindrical projections 62 which are upset to retain a third grille 64 with a sheet of resilient or rubbery material 66 interposed. A series of independent slits 70 are made in the sheet 66 to make depending flaps 72, each flap 72 extending almost the full distance between adjacent ribs of the intermediate grille 60.

Figure 3:
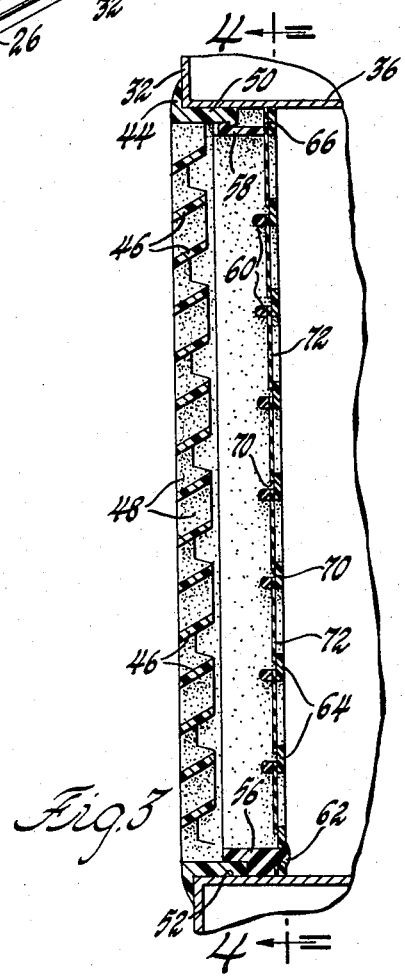
FIGURE 3 is a sectional view, further enlarged, looking in the direction of the arrows 3—3 in FIGURE 2.

FIGURE 7 depicts the relation between the lock pillar 32 in which the outlet grille 44 is installed. The arrangement is outboard of the seal 80 and space 82 is left between the pillar 32 and the door 84 so that as the car proceeds on the road a low pressure zone exists outside and next to the pillar giving a suction effect as previously referred to. No part of the vent arrangement appears to view when the door 84 is closed and venting of stale air is effectively carried out. The flaps 72 bend forwardly somewhat as shown in the dot and dash lines at 73 in FIGURE 6 to guide the air being discharged. When the car is not being used, the flaps 72 hang downwardly and entrance of dust and outside air is prevented. The duct work 36 illustrated in FIGURES 1 and 3 is omitted in FIGURE 7 for the latter figure pertains to the modification previously mentioned in which body structure 40 is relied upon to guide the spent air to the outlet grille 44.

We claim:
1. A vent arrangement in an automobile body structure having a passenger compartment and a side doorway leading to the latter, a door substantially traversing said doorway, a body pillar defining the rearward side of said doorway, a clearance space between said door and a forwardly facing side of said pillar, a seal between the latter and said door, an opening in said facing side outboard of said seal and leading to said clearance space, a vaned grille in said opening, one-way valve means cooperating with said grille in guiding air from said compartment to the atmosphere, said valve means including a flexible flap supported rearwardly of said grille yieldingly to close off said grille against a reverse flow of air, and a passage defined in said body and connecting a rear zone of said compartment to said opening.

References Cited

UNITED STATES PATENTS

| | | | |
|---|---|---|---|
| 2,717,173 | 9/1955 | Rabe | 296—28 |
| 2,937,047 | 5/1960 | Hezler et al. | 296—28 |
| 3,059,561 | 10/1962 | Wilfert | 98—2 |
| 3,263,591 | 8/1966 | Finch et al. | 98—2 |
| 3,274,915 | 9/1966 | Ziegenfelder | 296—28 |

BENJAMIN HERSH, *Primary Examiner.*

J. A. PEKAR, *Assistant Examiner.*